(12) United States Patent
Pado et al.

(10) Patent No.: US 7,803,309 B2
(45) Date of Patent: Sep. 28, 2010

(54) INFUSION MONITORING SYSTEM AND METHOD

(75) Inventors: Lawrence E. Pado, St. Charles, MO (US); Craig L. Brown, St. Peters, MO (US); Michael L. Vandernoot, Florissant, MO (US)

(73) Assignee: The Boeing Company, Chicago, IL (US)

( * ) Notice: Subject to any disclaimer, the term of this patent is extended or adjusted under 35 U.S.C. 154(b) by 946 days.

(21) Appl. No.: 11/614,025

(22) Filed: Dec. 20, 2006

(65) Prior Publication Data

US 2008/0152918 A1 Jun. 26, 2008

(51) Int. Cl.
*G01B 15/00* (2006.01)
(52) U.S. Cl. .................. 264/406; 264/493; 264/101; 264/402
(58) Field of Classification Search .................. 264/406, 264/493, 101, 402
See application file for complete search history.

(56) References Cited

U.S. PATENT DOCUMENTS

| | | | |
|---|---|---|---|
| 4,787,946 A * | 11/1988 | Romanski | .................... 156/137 |
| 5,942,182 A | 8/1999 | Hoge et al. | |
| 6,586,054 B2 | 7/2003 | Walsh | |
| 6,964,561 B2 | 11/2005 | Louderback et al. | |
| 7,147,818 B1 | 12/2006 | Rigas et al. | |
| 2002/0022422 A1 | 2/2002 | Waldrop, III et al. | |
| 2006/0191622 A1 | 8/2006 | Ritter et al. | |
| 2007/0090562 A1 * | 4/2007 | Hawkins | ..................... 264/257 |

FOREIGN PATENT DOCUMENTS

| | | |
|---|---|---|
| EP | 1 038 656 A1 | 9/2000 |
| WO | WO 2004/056546 A1 | 7/2004 |

OTHER PUBLICATIONS

International Search Report dated Oct. 1, 2008 for PCT Application No. PCT/US2007/088044.
Lee et al., "Analysis and minimization of void formation during resin transfer molding process," Composites Science and Technology, 66, pp. 3281-3289, (2006).

* cited by examiner

*Primary Examiner*—Joseph S Del Sole
*Assistant Examiner*—David N Brown, II
(74) *Attorney, Agent, or Firm*—Klintworth & Rozenblat IP LLC (57) ABSTRACT

The invention relates to systems and methods which may be used to determine when an uncured composite part is ready to be cured. In one embodiment, a system under the invention may comprise an infrared camera adapted to take infrared images of an uncured composite part, a heating device adapted to heat an uncured composite part, an image capture device adapted to capture infrared images taken by the infrared camera, and a computer adapted to analyze infrared images taken by the infrared camera in order to evaluate temperatures of an uncured composite part. The infrared images may be used to determine that the composite part is substantially covered, and/or completely covered, with resin and ready to be cured.

18 Claims, 7 Drawing Sheets

INFUSION MONITORING SYSTEM AND METHOD

BACKGROUND OF THE INVENTION

Molding processes, such as vacuum assisted resin transfer molding processes, may be used to produce a wide variety of composite parts. During these processes, fiber layers in the shape of the composite part being manufactured may be inserted into an opaque vacuum bag, and resin may be infused into the bag to cover the part. Prior to curing the part, the part needs to be completely covered with resin. If the part is not completely covered with resin prior to being cured, a void will be present which will result in a defective part. Many of the prior art systems and methods for curing do not have a way to determine whether the bagged part is completely covered with resin prior to being cured.

A system and/or method is needed for determining when an uncured composite part is substantially covered, and/or completely covered, with resin and ready to be cured.

SUMMARY OF THE INVENTION

In one aspect of the invention, a system is disclosed for determining when an uncured composite part is ready to be cured. The system comprises an infrared camera adapted to take infrared images of an uncured composite part, a heating device adapted to heat an uncured composite part, an image capture device adapted to capture infrared images taken by the infrared camera, and a computer adapted to analyze infrared images taken by the infrared camera in order to evaluate temperatures of an uncured composite part.

In a further aspect of the invention, a method of determining when an uncured composite part is ready to be cured is disclosed. In one step, an uncured composite part is provided. In another step, resin is injected onto the uncured composite part. In an additional step, the uncured composite part is heated with a heating device. In still another step, an infrared image of the uncured composite part is taken. In yet another step, temperatures of the uncured composite part are analyzed using the infrared image in order to determine whether the uncured composite part is substantially covered with the resin.

In another aspect of the invention, a cured composite part is disclosed. Prior to the composite part being cured, resin was injected onto the composite part, the composite part was heated, an infrared image of the composite part was taken, and temperatures of the composite part were analyzed using the infrared image in order to determine that the composite part was substantially covered with resin.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
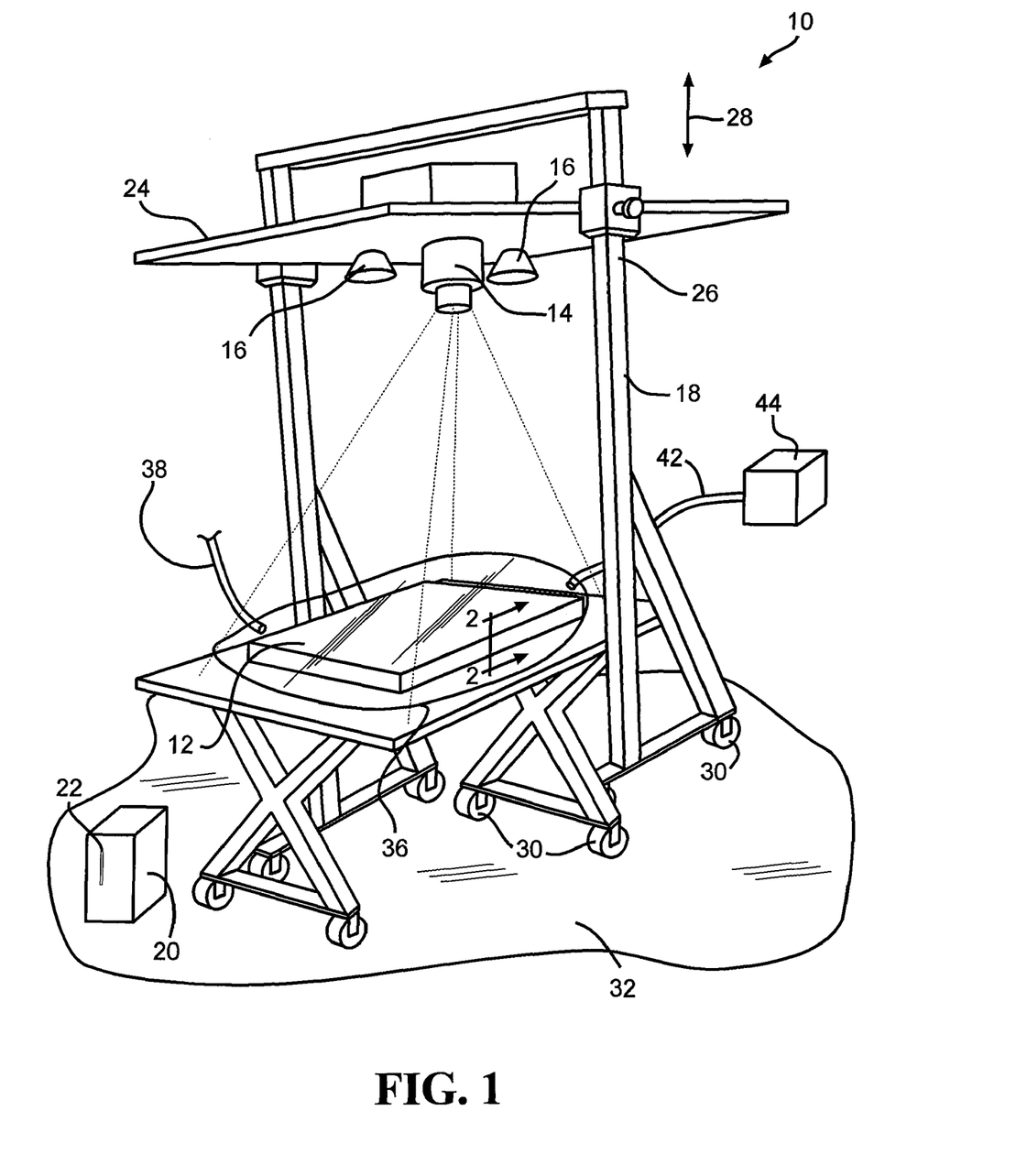
FIG. 1 depicts a perspective view of one embodiment of a system for determining when an uncured composite part is ready to be cured.

FIG. 1 depicts a perspective view of one embodiment of a system 10 for determining when an uncured composite part 12 is ready to be cured. In one embodiment, the system 10 may comprise an infrared camera 14, two heating devices 16, a moveable platform 18, and a computer 20 having an image capture device 22. The infrared camera 14 may comprise an infrared video camera adapted to take frame by frame infrared video images of the uncured composite part 12. In other embodiments, any type of infrared camera 14 may be utilized. The heating devices 16 may comprise infrared heating lamps, such as two Heraeus twin tube carbon emitters, which are adapted to heat the uncured composite part 12. In other embodiments, any number and type of heating devices may be utilized to heat the uncured composite part 12. Preferably, the heating devices 16 perform at a high efficiency to cover a wide area within minimum power requirements, have a fast response time to heat and cool within 1 to 4 seconds, and radiate uniform energy.

The infrared camera 14 and heating devices 16 may be attached to a moveable surface 24 of the moveable platform 18. The moveable surface 24 may be moveably attached to a frame 26 so that the moveable surface 24 may be raised up and down along the frame 26 in direction 28. The platform 18 may have wheels 30 attached to its frame 26 to allow the platform 18 to be rolled along a ground surface 32. In other embodiments, the camera 14 and heating devices 16 may be attached to various portions of differing types of platforms 18. In still other embodiments, a platform 18 may not be used and the camera 14 and heating devices 16 may be attached to varying types of apparatus and/or held in moving or stationary positions with respect to one or more surfaces of varying types of apparatus or ground surface 32.

The computer 20 may comprise any number and/or type of computer processor. The computer 20 may be adapted to analyze, using software having an image processing algorithm described later in this disclosure, infrared images taken by the infrared camera 14 in order to evaluate temperatures of the uncured composite part 12 to determine whether the part 12 has been substantially covered, and/or completely covered, with resin. The image capture device 22 may comprise an image capture card which is connected to the computer 20. The image capture device 22 may be adapted to capture and store frame by frame infrared images taken by the infrared camera 14, for evaluation by the computer 20. In still other embodiments, any number, type, configuration, orientation, and/or size may be used for each of the above-listed components of the system 10, including the camera 14, heating devices 16, platform 18, computer 20, and image capture device 22.

Figure 2:
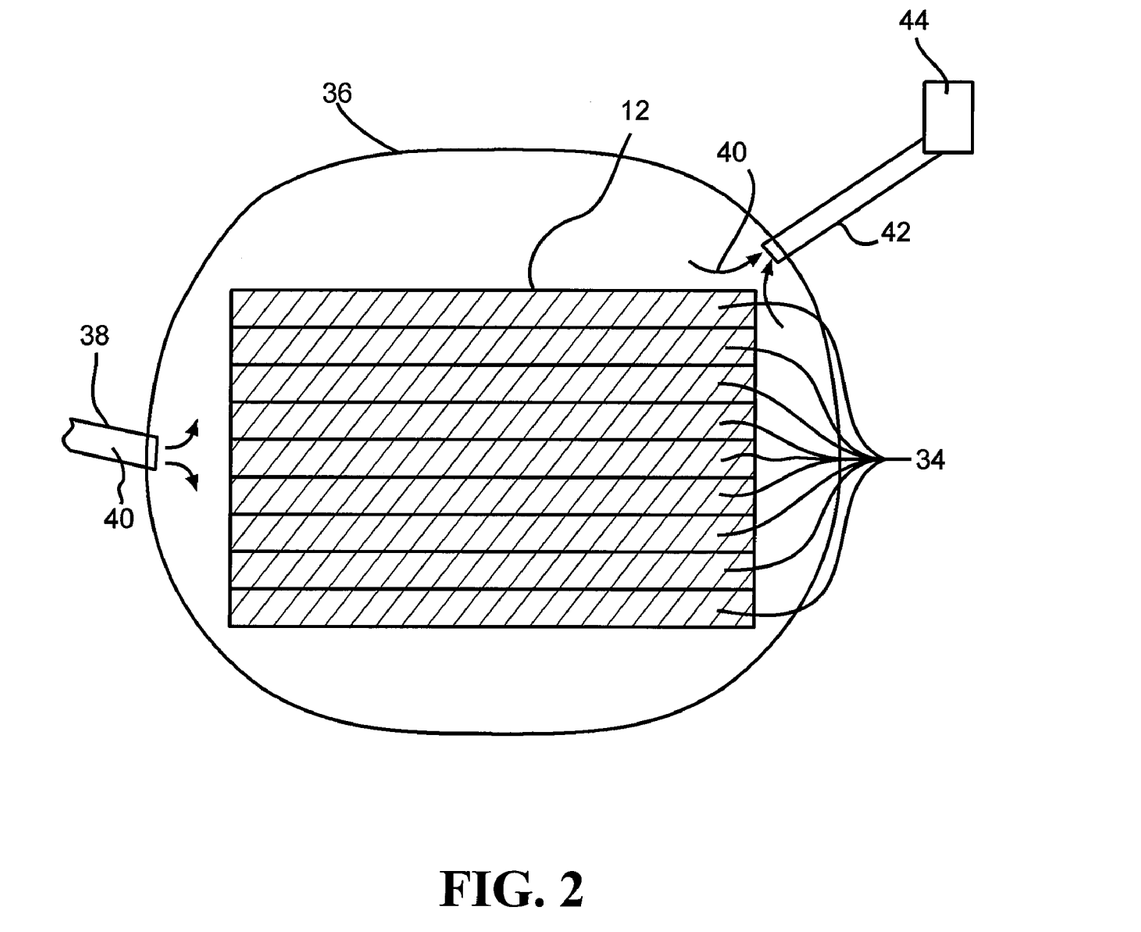
FIG. 2 depicts a cross-sectional view of the uncured composite part of FIG. 1 along 2-2.

FIG. 2 shows a cross-sectional view of the uncured composite part 12 of FIG. 1 along 2-2. As shown in FIG. 2, the uncured composite part 12 may comprise layers of carbon fiber sheets 34 in the shape of a desired part. In one embodiment, the uncured composite part 12 may comprise an aircraft part. In other embodiments, the uncured composite part 12 may comprise non-aircraft parts such as vehicle parts, household parts, tool parts, or other types of parts.

The uncured composite part 12 may be disposed within a vacuum bag 36. One or more resin infusion tubes 38 may be inserted within the vacuum bag 36 for infusing resin 40 into the bag 36 onto and/or around the part 12. One or more resin output tubes 42 may be inserted within the vacuum bag 36 for extracting resin 40 from the bag 36 utilizing vacuum pressure exerted by a vacuum 44. Resin 40 may be infused into the bag 36 onto and/or around the part 12, utilizing the vacuum 44 and output tubes 42. In such manner, the surfaces of the part 12 may be covered with resin 40 so that the part 12 may be later cured. In other embodiments, the uncured composite part 12, vacuum bag 36, vacuum 44, and input and output tubes 38 and 42 may be of varying number, types, sizes, orientations, and configurations.

Figure 3:
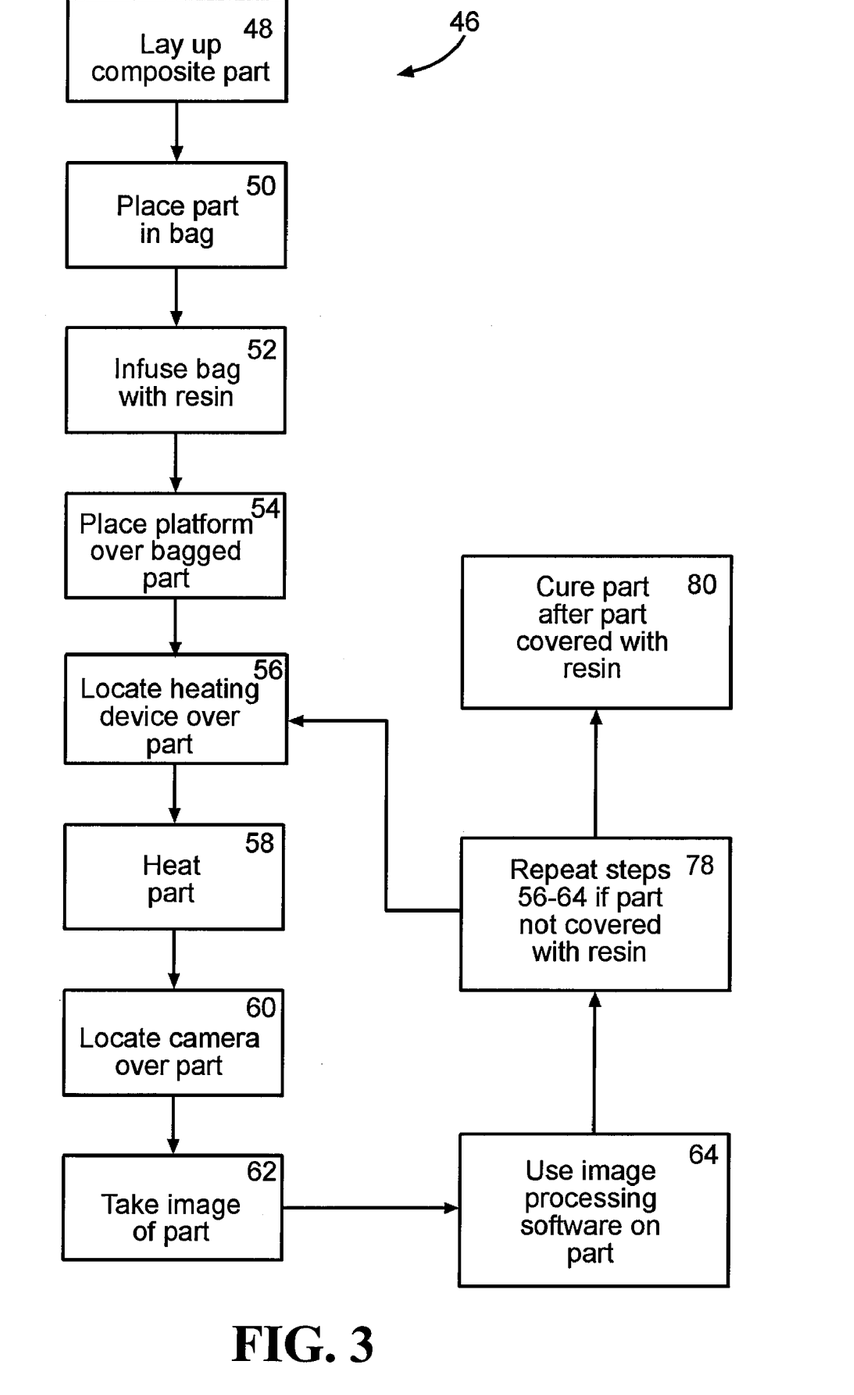
FIG. 3 illustrates a flow-chart under one embodiment of a method of the invention for determining when an uncured composite part is ready to be cured.

FIG. 3 illustrates a flow-chart 46 under one embodiment of a method of the invention for determining when an uncured composite part 12 is ready to be cured. In step 48, a plurality of dry carbon fibers sheets 34 may be laid up into the shape of the desired uncured composite part 12. In step 50, the part 12 may be placed in a vacuum bag 36 with input and output tubes 38 and 42 extending into the bag 36, with output tube 42 connected to a vacuum 44. The vacuum bag 36 may be made of various materials and layers, such as opaque materials, to contain resin 40 within the bag 36, and to apply even pressure across the part 12.

In step 52, the bag 36 may be infused (injected) with resin 40 by sucking resin 40 through input tube 38, into bag 36, and out of tube 42. During this step, the bag 36 may fill up with resin 40 partly covering part 12 with resin 40. However, one or more voids may exist at various portions of the part 12 where the part 12 has not been completely covered with resin 40. At this point in time, it may be impossible to know whether the resin 40 has completely covered all areas of the part 12 without using the system and/or method of the invention since the resin 40 and dry fiber of the part 12 may be of substantially the same temperatures.

Figure 4:
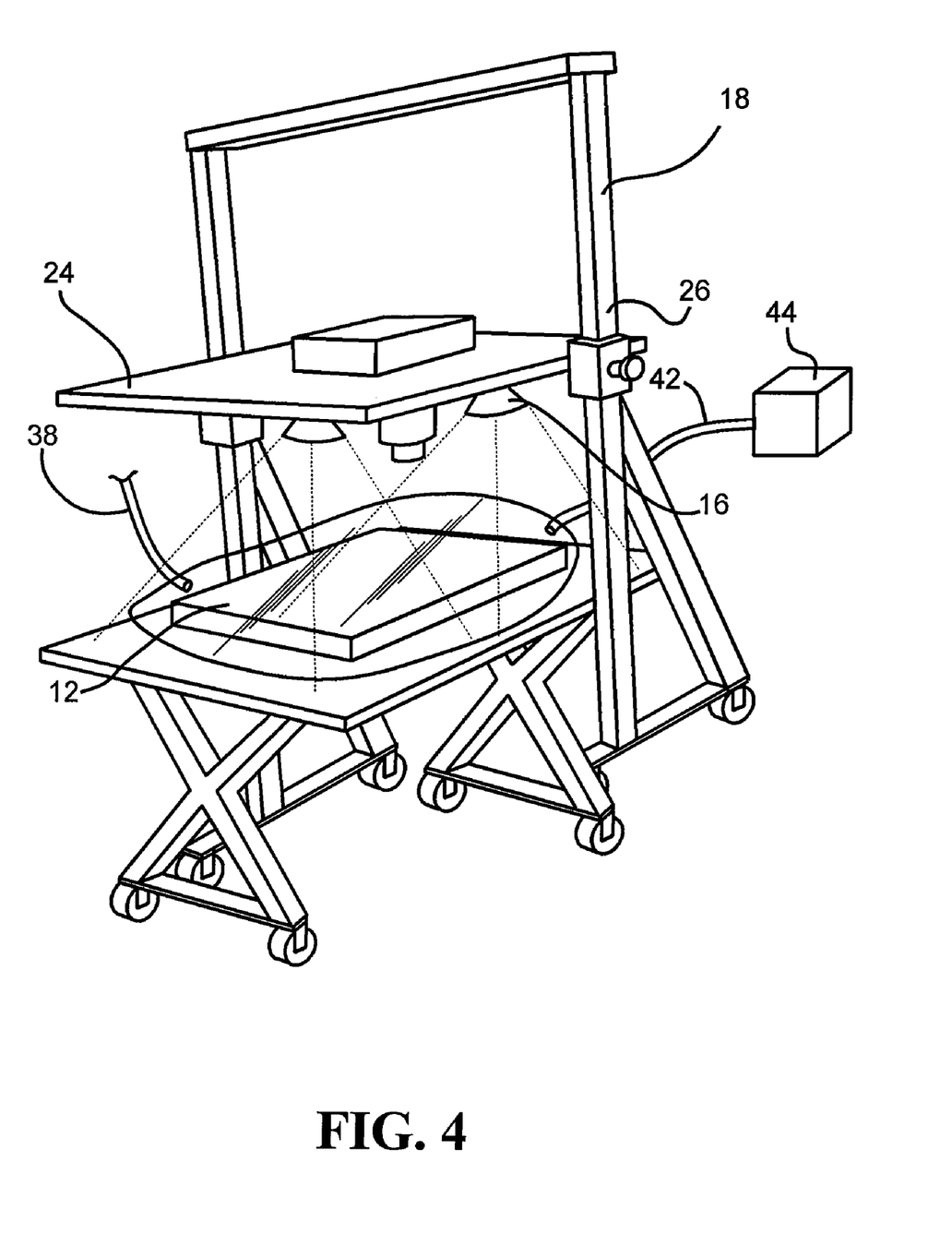
FIG. 4 depicts the moveable surface of the platform of FIG. 1 moved downward along the frame to bring the heating devices into position over the part.
Figure 5:
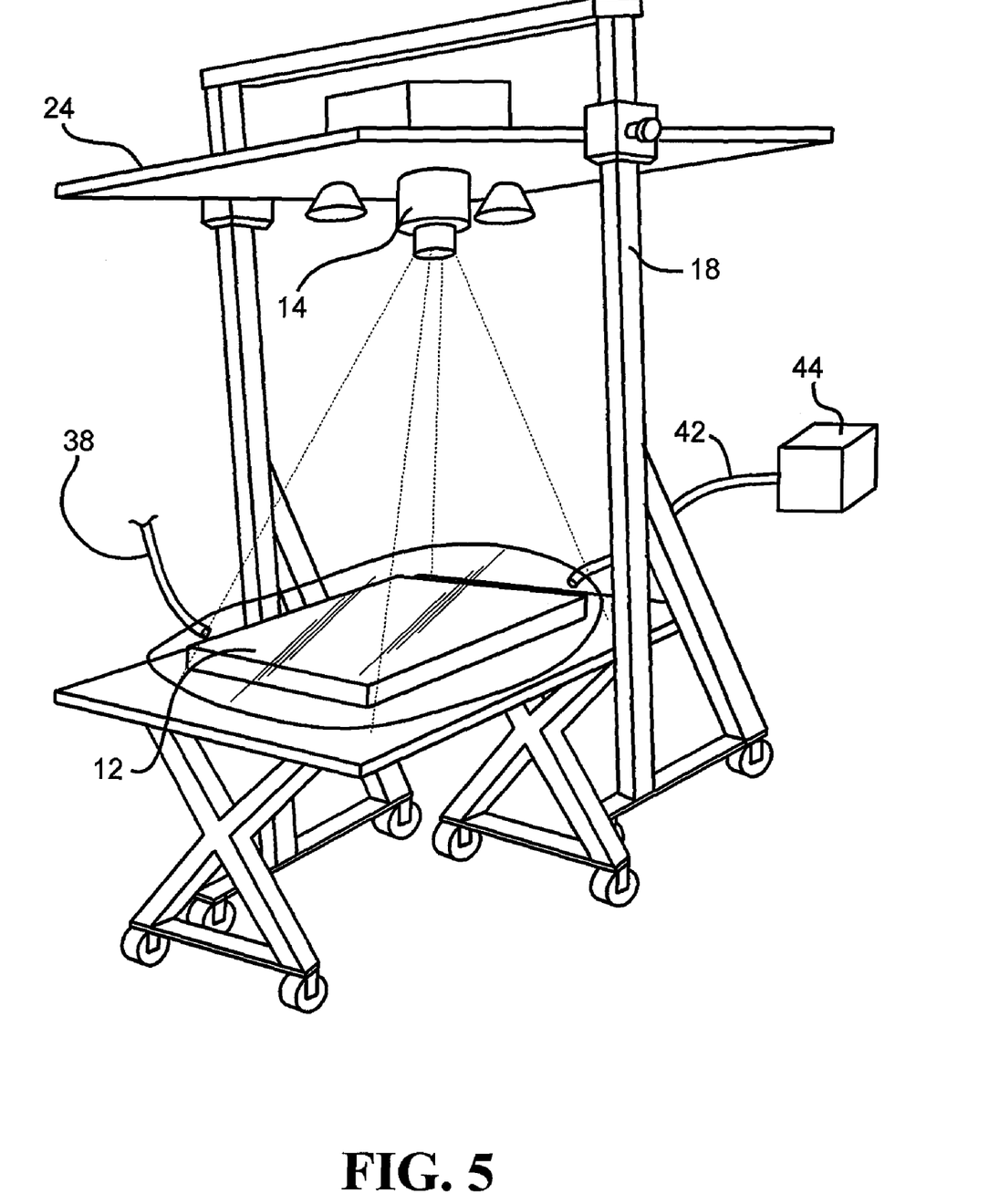
FIG. 5 depicts the moveable surface of the platform of FIG. 4 moved upward to bring the camera high enough so that its field of view covers the entire part.

In step 54, the platform 18 may be placed over the bagged part 12. In other embodiments, the platform 18 may be placed over the bagged part 12 before infusion of the resin 40 begins. In step 56, as shown in FIG. 4, the moveable surface 24 of the platform 18 of FIG. 1 may be moved downward along the frame 26 to bring the heating devices 16 into position over the part 12. In step 58, the heating devices 16 may be activated for approximately ten seconds in order to heat up the part 12. In other embodiments, the heating devices 16 may be activated for varying amounts of time. In step 60, as shown in FIG. 5, when the heating cycle is over, the moveable surface 24 of the platform 18 of FIG. 4 may be moved upward to bring the camera 14 high enough so that its field of view may cover the entire part 12. In step 62, after waiting at least twenty-five seconds to allow time for the wet (covered with resin) and dry (not covered with resin) areas of the part 12 to reach maximum difference in temperature, the camera 14 may take a frame infrared image of the part 12. The image of the part 12 may be sent to the computer 20, and the image capture device 22 may capture the image of the part 12. In other embodiments, the camera 14 may take a frame image after waiting varying amounts of time.

In step 64, the computer 20 may use software having an image processing algorithm in order to evaluate the infrared image of the part 12 to analyze the temperatures of the part 12 in order to determine whether the part 12 has been substantially covered, and/or completely covered, with resin 40. This may be possible because as the part 12 cools, the areas that have already been infused with resin 40 may cool faster than the dry resin-free areas or voids. As such, the infrared image of the part 12 may show these temperature differences.

In such manner, the image processing algorithm may be used to determine whether the part 12 has a substantially uniform temperature and therefore has been substantially covered, and/or completely covered, with resin 40, or whether the part 12 has substantially non-uniform temperatures and therefore has not been substantially covered, and/or completely covered, with resin 40. In the case where the image processing algorithm determines that the part 12 has substantially non-uniform temperatures, the areas of the part 12 which have the higher temperatures may be dry (not covered with resin), and the areas of the part 12 which have the lower temperatures may be wet (covered with resin).

Figure 6:
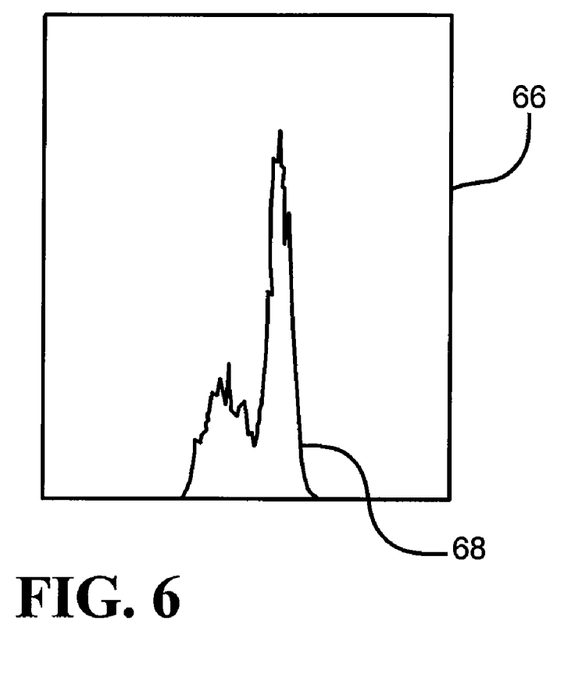
FIG. 6 depicts one embodiment of an uncorrected image, and the image's histogram, which was snapped using an infrared camera during an infusion of a part that was approximately forty-percent complete.
Figure 7:
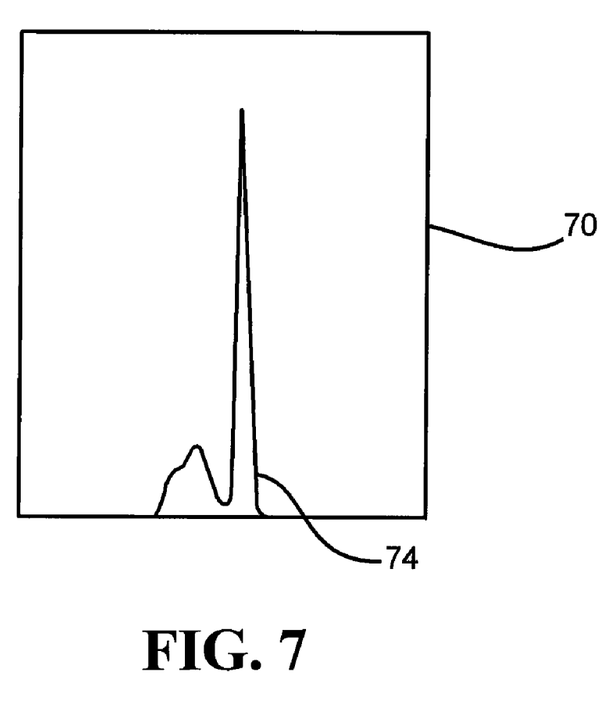
FIG. 7 depicts the image of FIG. 6 after a correction image has been subtracted from the image.

In one embodiment, the image processing algorithm may begin by obtaining a baseline image at least one cycle before the start of the infusion of the resin 40 and at least ten minutes after the beginning of the heating cycle. This baseline image may then be darkened so that the lowest pixel value is made zero and all other pixel brightness values are shifted downward by an equal amount. This darkened baseline image may be called the correction image. For all subsequent images, the correction image may be subtracted from the current image to remove image defects that may occur from imperfect surfaces and uneven heating. FIG. 6 illustrates one embodiment of an uncorrected image 66 which was snapped during an infusion that was approximately forty-percent complete. A histogram 68 of the image 66 may illustrate how the intensities of pixels in the image are distributed by graphing the number of pixels at each intensity level. As shown in FIG. 6, both the image 66 and its respective histogram 68 may be rough. FIG. 7 illustrates the image 70 of FIG. 6 after the correction image has been subtracted from the image 66. As shown, both the image 60 and its histogram 74 are now smooth.

Figure 8:
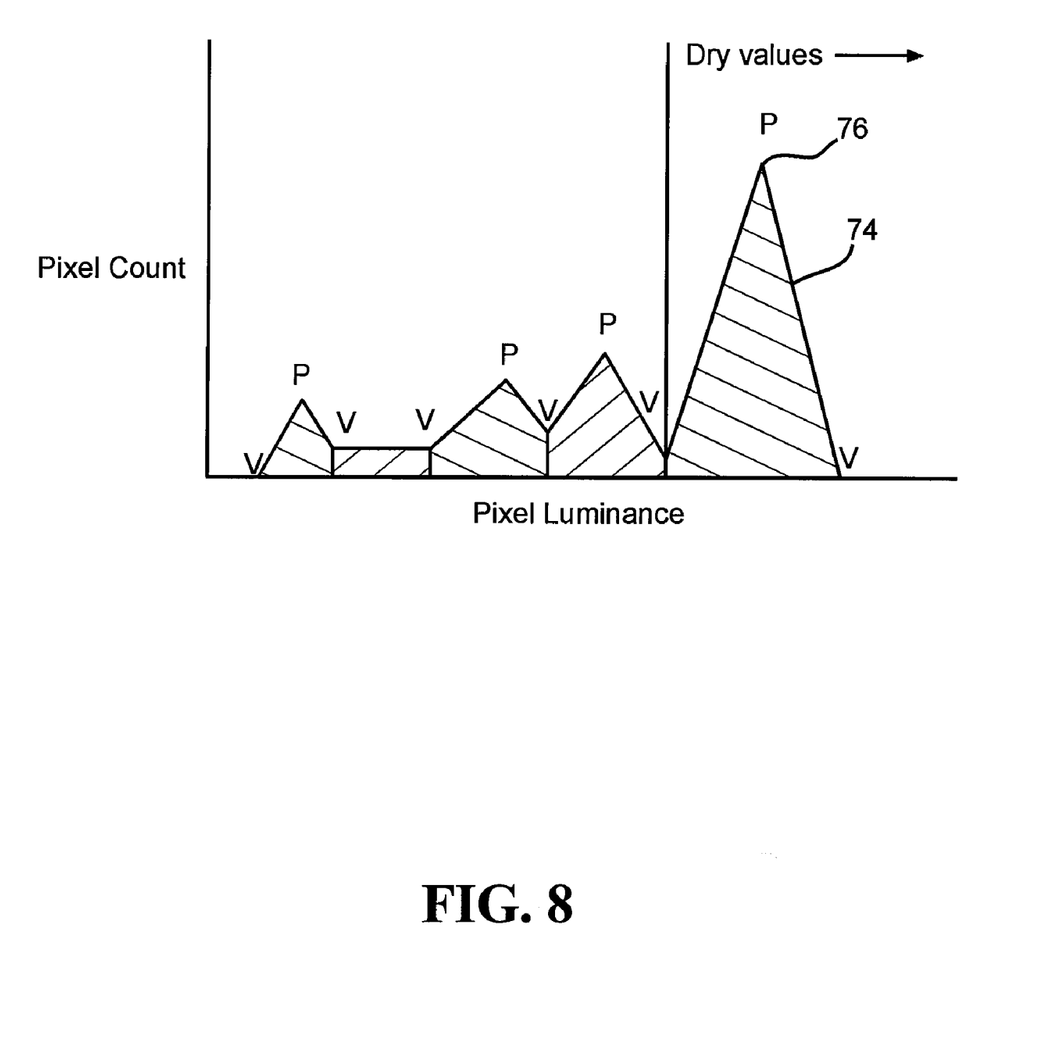
FIG. 8 depicts one embodiment of an exemplary histogram, of an infrared image of a part, with peaks P and valleys V identified.

For each subsequent image taken of the part 12, the algorithm may be used to determine which portions of the part 12 have been wetted with resin 40 and which portions are still dry utilizing the histogram 74 of the image 60. FIG. 8 illustrates one embodiment of an exemplary histogram 74 of an infrared image 70 with peaks P and valleys V identified. The right-most peak 76 may denote dry areas of the part 12 which are not covered by resin 40, and all pixel values to the left of the right-most peak 76 may denote wet areas of the part 12 which are covered by resin 40. The algorithm may determine the area under each peak P in order to determine how much of the image 70 is covered by a certain type of pixel, such as white pixels which denote hot and dry areas which are not covered by resin 40, or black pixels which denote cold and wet areas which are covered by resin 40. As resin 40 is infused onto the part 12, the right-most peak 76 may get smaller and smaller until it eventually disappears and turns from white pixels into black pixels to denote that the area is cold and wet and now covered by resin 40. In such manner, the algorithm may be used to determine when the histogram 74 of the infrared image 70 contains only black pixels to signify that the part 12 has been completely covered by resin 40 and is now ready to be cured.

In step 78, steps 56 through 64, may be repeated if the image processing algorithm determines that the part 12 has not been substantially covered, and/or completely covered, with resin 40. Steps 56 through 64 may be repeated over and over again until the image processing algorithm determines that the part 12 has been substantially covered, and/or completely covered, with resin 40. In step 80, after the image processing algorithm determines that the part 12 has been substantially covered, and/or completely covered, with resin 40, the part 12 may be put into an oven and cured.

In another embodiment of the invention, a cured composite part 12 may be provided. Prior to the composite part 12 being cured, resin 40 may have been injected into the composite part 12, the composite part 12 may have been heated, an infrared image 70 of the composite part 12 may have been taken, and temperatures of the composite part 12 may have been analyzed using the infrared image 70 in order to determine that the composite part 12 was substantially covered with resin 40.

The invention may reduce one or more problems of one or more of the prior art curing systems and/or methods. For instance, the invention may allow for costs savings, quality improvement, consistency improvement, defect improvement, time savings, and/or reduce one or more other problems experienced by one or more of the prior systems and/or methods.

It should be understood, of course, that the foregoing relates to exemplary embodiments of the invention and that modifications may be made without departing from the spirit and scope of the invention as set forth in the following claims.

We claim:

1. A method of determining when an uncured composite part is ready to be cured comprising:
   providing an uncured composite part;
   injecting resin onto the uncured composite part;
   heating the uncured composite part with a heating device;
   taking an infrared image of the uncured composite part; and
   analyzing temperatures of the uncured composite part using the infrared image in order to determine whether the uncured composite part is substantially covered with the resin;
   wherein all of the steps of the method are done before beginning the cure process.

2. The method of claim 1 wherein the uncured composite part comprises an aircraft part.

3. The method of claim 1 wherein the uncured composite part comprises layers of fiber sheets.

4. The method of claim 3 wherein the layers of fiber sheets are disposed in a bag.

5. The method of claim 1 wherein resin is injected onto the uncured composite part utilizing a vacuum and one or more tubes.

6. The method of claim 1 wherein the heating device comprises an infrared heating lamp.

7. The method of claim 1 wherein the uncured composite part is heated ten seconds with the heating device.

8. The method of claim 1 wherein an infrared camera is used to take the infrared image of the uncured composite part.

9. The method of claim 1 wherein the infrared image of the uncured composite part is taken twenty-five seconds after the uncured composite part is heated with the heating device.

10. The method of claim 1 wherein a computer containing software having an image processing algorithm is used to analyze the temperatures of the uncured composite part using the infrared image in order to determine whether the uncured composite part is substantially covered with the resin.

11. The method of claim 1 wherein colder portions of the infrared image signify that the resin is over a portion of the uncured composite part, and warmer portions of the infrared image signify the resin is not over another portion of the uncured composite part.

12. The method of claim 1 further comprising the step of using a moveable platform to heat the uncured composite part and to take the infrared image of the composite part.

13. The method of claim 1 further comprising heating and cooling the uncured composite part within 1 to 4 seconds.

14. The method of claim 1 further comprising repeating the heating of the uncured composite part, and the taking of the infrared image of the uncured composite part, until the analysis of the temperatures of the uncured composite part indicates that the uncured composite part is completely covered with the resin.

15. The method of claim 14 further comprising curing the uncured composite part after the analysis of the temperatures of the uncured composite part indicates that the uncured composite part is completely covered with the resin.

16. The method of claim 1 wherein the taking the infrared image of the uncured composite part comprises taking frame by frame infrared video images of the uncured composite part.

17. The method of claim 1 further comprising using a correction image of the uncured composite part to remove image defects from the infrared image of the uncured composite part.

18. The method of claim 17 wherein the correction image is created by taking a baseline image of the uncured composite part at least one cycle before the injecting the resin onto the uncured composite part and a period of time after the beginning of the heating of the uncured composite part, and darkening the baseline image to create the correction image, and the removing the image defects from the infrared image of the uncured composite part comprises subtracting the correction image from the infrared image of the uncured composite part to remove the image defects.

\* \* \* \* \*